United States Patent [19]
Cecchetti

[11] Patent Number: 5,932,973
[45] Date of Patent: Aug. 3, 1999

[54] MULTIFILAMENT LAMP, A METHOD FOR VARYING ITS BRIGHTNESS AND CONTROL AND OPERATING CIRCUIT THEREFOR

[75] Inventor: Massimo Cecchetti, Pernate, Italy

[73] Assignee: STMicroelectronics, S.r.l., Agrate Brianza, Italy

[21] Appl. No.: 08/612,721

[22] Filed: Mar. 8, 1996

[30] Foreign Application Priority Data

Mar. 9, 1995 [EP] European Pat. Off. .............. 95830085

[51] Int. Cl.⁶ ................................................ H05B 39/00
[52] U.S. Cl. ................................ 315/64; 315/67; 315/68; 340/310.01; 307/157; 323/905
[58] Field of Search ....................... 315/68, 64, 67, 315/69; 340/310.01; 307/157; 323/905

[56] References Cited

U.S. PATENT DOCUMENTS

| | | | |
|---|---|---|---|
| 3,886,400 | 5/1975 | Dill | 315/64 |
| 4,080,548 | 3/1978 | Johnson | 315/68 |
| 5,345,143 | 9/1994 | Little | 315/64 |

FOREIGN PATENT DOCUMENTS

| | | | |
|---|---|---|---|
| 0 244 777 | 11/1987 | European Pat. Off. | H05B 41/29 |
| 0 247 382 | 12/1987 | European Pat. Off. | H05B 41/00 |
| 2 117 687 | 10/1972 | Germany | H05B 39/00 |
| 2800472 | 7/1978 | Germany | 340/310.01 |
| WO 8706325 | 10/1987 | WIPO | H01K 9/08 |

OTHER PUBLICATIONS

"Smart Light Bulbs," by Nancy L. Ross, Washington Home, Mar. 3, 1994, p. 5.

*Primary Examiner*—Arnold Kinkead
*Attorney, Agent, or Firm*—David V. Carlson; Frederick M. Fliegel; Seed and Berry LLP

[57] ABSTRACT

An incandescent lamp has an attachment for connection to a two-wire electrical power line and a bulb containing a radiating element. At least two filaments are housed in the bulb and constitute the radiating element, and circuitry has an input connected to the electrical power line and an output connected to filaments. When a selection signal indicating the desired brightness is passed to circuitry, preferably along the electrical power line, and acts in such a way that circuitry selectively provides a feed to filaments on the basis of the selection signal, a change in brightness is obtained without deterioration of the color characteristics because the filaments operate under their rated operating conditions. The change in brightness will not be continuous, but discrete, but is more than acceptable for domestic requirements even with a small number of filaments.

18 Claims, 2 Drawing Sheets

MULTIFILAMENT LAMP, A METHOD FOR VARYING ITS BRIGHTNESS AND CONTROL AND OPERATING CIRCUIT THEREFOR

TECHNICAL FIELD

This invention relates to a multifilament lamp and a method for varying its brightness, and a control and operating circuit therefor.

BACKGROUND OF THE INVENTION

The problem of obtaining various levels of brightness from a single lamp is well known.

In the case of incandescent lamps a reduction in brightness can be achieved simply by reducing the voltage applied to the filament. This, however, results in an appreciable reduction in the luminous efficiency, which is already appreciably low for this type of lamp (<15%). In addition to this, the color characteristics of the light depend greatly on the applied voltage. Similar considerations also apply when the electrical power which the filament converts into radiating energy is varied from its rated power by other means. Many of the arrangements existing on the market also have stability problems associated with the use of potentiometers. In fact, with the passage of time the brightness of a lamp controlled by a potentiometer tends to vary, particularly when the moving terminal of the potentiometer lies in an intermediate position.

Multifilament lamps are known in the field of motor vehicle headlamps. In this field the various filaments are used alternately to obtain different lighting effects; for example, a lamp having a first filament for a dipped beam effect, a second filament for a full beam effect and a third filament for a fog-lamp effect is known from international patent application WO 8706325, incorporated herein by reference. These lamps also have a plurality of contacts—normally at least one at ground contact, and one for each filament.

In the case of fluorescent lamps, which are nevertheless of greater efficiency, more complicated electronic arrangements are used.

The problem of obtaining incandescent lamps with satisfactory light color characteristics is also well known.

It is also known from physics that the Stefan-Boltzman law, which links radiation to the fourth power of the absolute temperature, and Plank's law, which links radiation to frequency, and is bell-shaped, apply to so-called "black bodies." These laws apply to a lamp filament only to a first approximation. Of course the useful radiation from a filament is only that corresponding to the visible light band.

SUMMARY OF THE INVENTION

The purpose of this invention is therefore to provide variation in the brightness of an incandescent lamp while preserving its color characteristics.

An incandescent lamp is provided with an attachment for connection to a two-wire electrical circuit and a bulb containing a radiating element. The lamp according to this invention is provided with at least two further filaments housed in the bulb having the radiating element, and circuitry whose input is connected to the power line and whose output is connected to the filaments.

By sending a selection signal indicating the desired brightness to the circuitry and acting so that the circuitry selectively provides a feed to the filaments in relation to the selection signal, a variation in brightness is achieved without deterioration of the color characteristics because the filaments are operating under their rated operating conditions. The change in brightness will not be continuous, but discrete, but more than acceptable for domestic requirements, even with a small number of filaments.

Advantageously this selection signal is sent to the circuitry via the two-wire electrical line itself in such a way that no additional wires and/or devices (e.g. operating at radio frequencies) are required in order to effect this.

It is also advantageous that the filaments be selected in such a way as to radiate light of a brightness such that one is substantially twice the other. In this way it is in fact possible, for example, to obtain eight different levels of brightness with only three filaments.

BRIEF DESCRIPTION OF THE DRAWINGS

The invention will become more clear from the description below with reference to the appended drawings, in which.

DETAILED DESCRIPTION OF THE INVENTION

Figure 1:
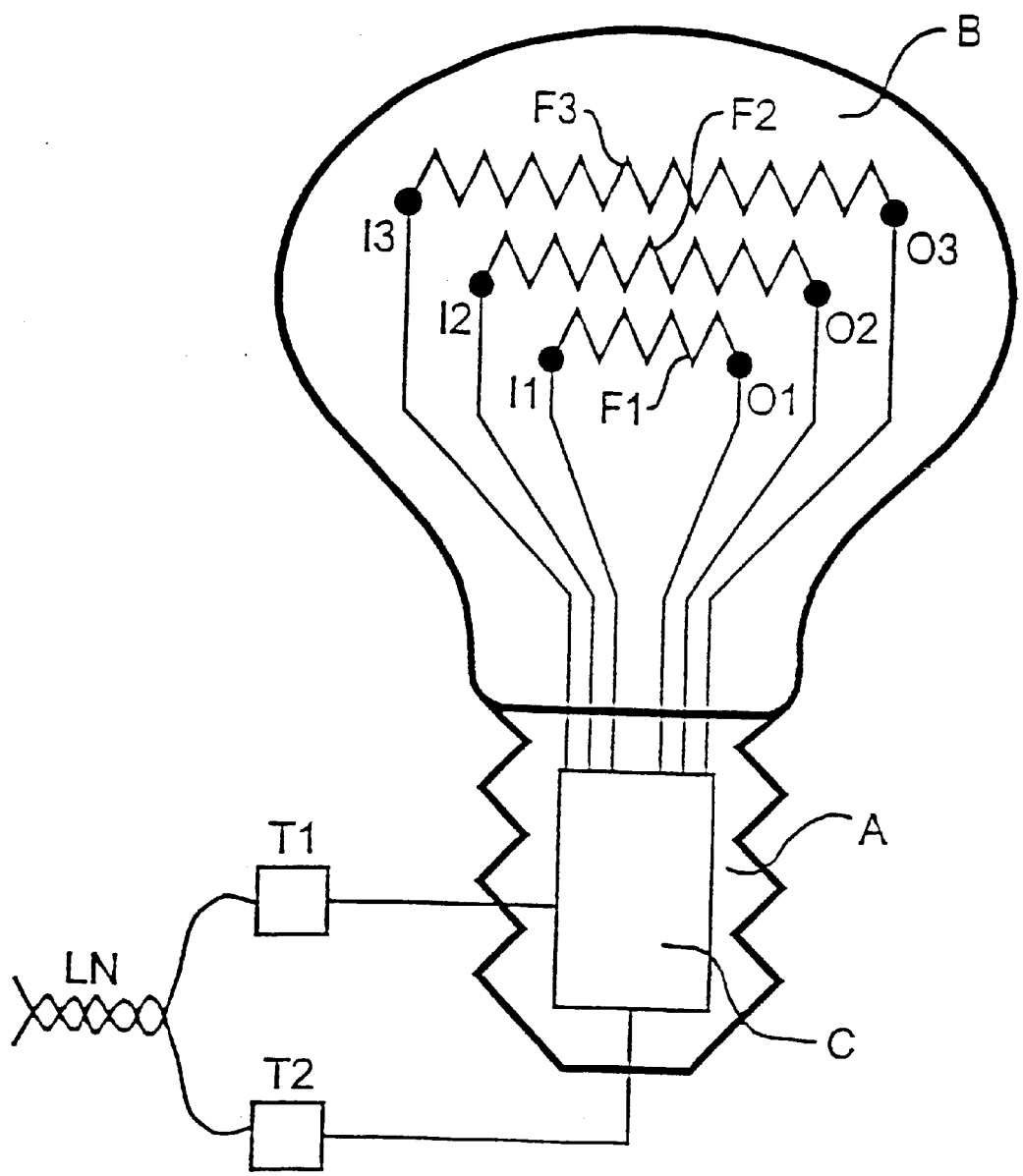
FIG. 1 shows a diagrammatical view of a lamp according to the invention.

The incandescent lamp illustrated in FIG. 1 is provided with an attachment A for connection to a two-wire electrical power line LN and a bulb B. Preferably attachment A is of the standard type. Line LN may be for direct or alternating current or for low or high voltages.

Located within bulb B is a first filament F1, a second filament F2 and a third filament F3. In a simpler embodiment there may be only two filaments, while in more complicated embodiments there may be more than 3 filaments.

Filaments F1, F2, and F3 may be arranged within bulb B in such a way that the radiation is effectively uniform in all directions regardless of which, and how many, filaments are lit. For example, filaments F1, F2 and F3 may be shaped as concentric circumferential arcs located at different distances from attachment A.

Housed within attachment A is circuitry C connectable to line LN at its input and connected to filaments F1, F2 and F3 at its output. If the circuitry requires more space than that available within an attachment of the standard type, it will be necessary to provide a larger attachment, or, more advantageously, provide a suitable volume between attachment A and bulb B. This circuitry C is capable of selectively providing a supply (taken from line LN) to filaments F1, F2 and F3 in accordance with a selection signal received from line LN and indicating a level of brightness.

The selection signal may be superimposed onto the supply and both should be propagated simultaneously along line LN. This selection signal may for example be a digital or analog signal. It will then be the task of a suitable "switch" upstream from line LN to superimpose the selection signal with the information content corresponding to the user's lighting needs onto the supply.

If the signal is digital it could for example comprise a sequence of three bits in which the configuration "000" corresponds to a brightness level of 0 and configuration "111" corresponds to the maximum brightness which the lamp can provide.

The sending of signals with an information content superimposed onto a power supply is known. An example of a "transmitter" circuit and a "receiver" circuit for lighting applications is found in European Patent Applications Nos. EP 247 382 and EP 244 777, respectively. These applications are herein incorporated by reference.

Circuitry C determines whether a supply should be provided to one or more of the three filaments F1, F2 and F3 on the basis of the sequence of bits received. For example, on receiving configuration "000" it would switch off all three filaments, while on receiving configuration "111" it would switch on all three filaments.

It is advantageous that if no selection signal is received circuitry C should provide a supply to all three filaments, or, more generally, to a predetermined number thereof. In fact, if the lamp according to this invention has to be inserted into a lighting device of the conventional type, the lamp would operate correctly, but without the possibility of varying the brightness.

It is also advantageous that circuitry C should also provide a selective feed to filaments F1, F2 and F3 in relation to the operating condition of the filaments themselves. For example, assuming that the three filaments F1, F2 and F3 are capable of providing the same level of brightness and assuming that circuitry C is configured on the basis of a selection signal received to provide a feed to first filament F1 and second filament F2, it is advantageous that if second filament F2 is broken, circuitry C should supply a feed to third filament F3. Of course it is necessary to provide means for detecting such damage to the filaments, for example by measuring the current passing through them, within the circuitry.

Using more sophisticated circuitry it is also advantageous to bear in mind the previous operating condition of the various filaments and therefore to use them to provide lighting in the most uniform manner possible, thus extending the overall life of the lamp.

A particularly advantageous arrangement includes using filaments capable of radiating light such that a brightness from one filament is substantially twice the brightness from another filament. In general the brightness obtained is directly proportional to the electrical power provided to the filament and partly converted into light. In fact, assuming that a first filament F1 having a rating of 20 watts, a second filament F2 having a rating of 40 watts and a third filament F3 having a rating of 80 watts are used, it is possible to obtain 8 different levels of brightness corresponding respectively to the wattages 0, 20, 40, 60, 80, 100, 120, 140, which is the same thing as having a 140 watt lamp in which the brightness can be adjusted in steps of 20 watts.

Using three filaments having a power in one which is twice the other is a good compromise between continuity in adjustment of the brightness obtained and complexity in the construction of the lamp (both as regards the electronics and as regards the mechanical portion). Of course two or four filaments are also to be regarded as reasonable choices. The use of a larger number of filaments does not typically find any application in the lighting of rooms.

Figure 2:
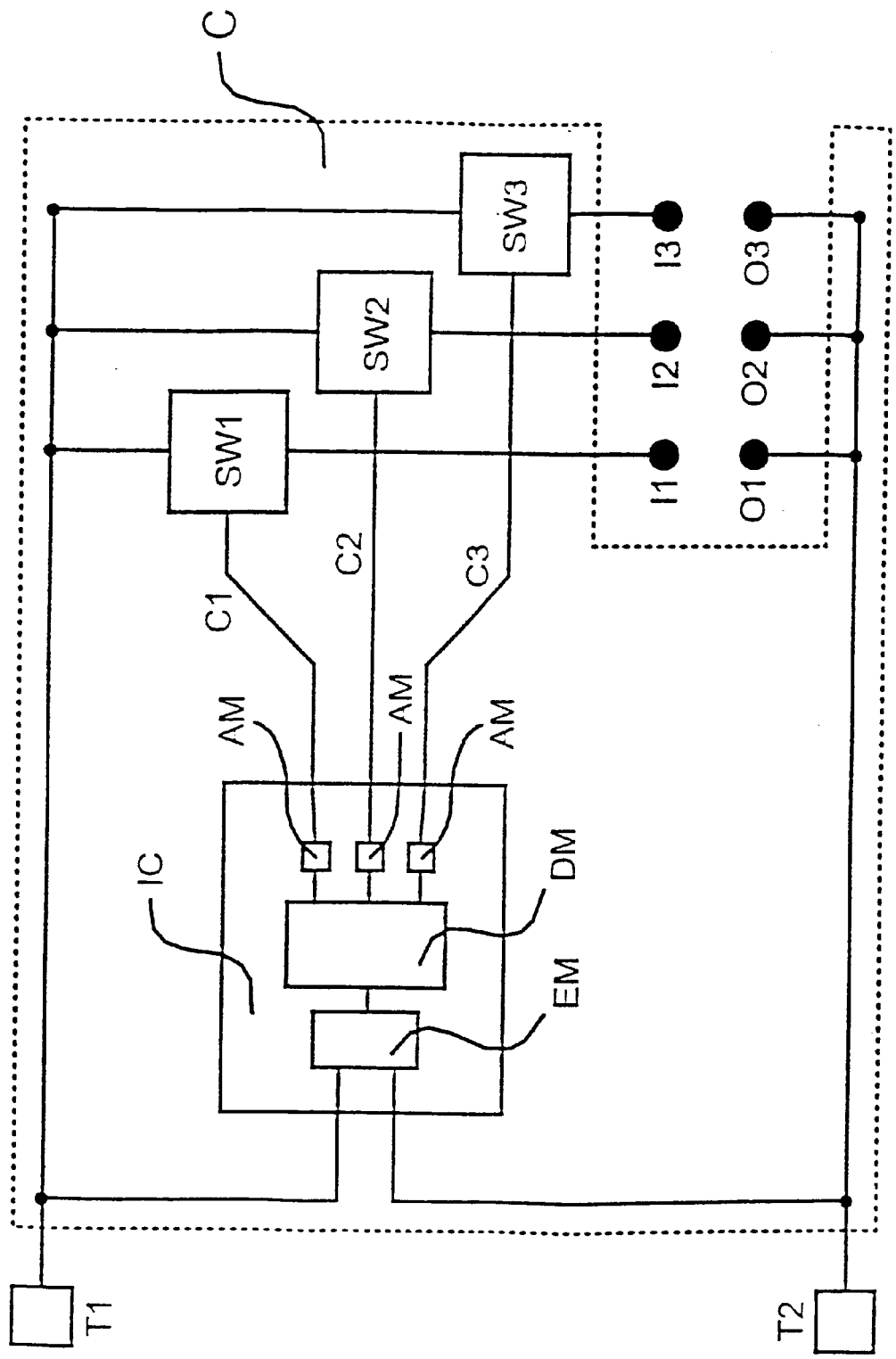
FIG. 2 shows a block diagram of circuitry according to this invention which can be used for the lamp in FIG. 1.

FIG. 2 shows a block diagram of circuitry C according to this invention which can be used with the lamp in FIG. 1. This circuitry is designed for three filament lamps but it can clearly be easily modified for lamps having any number of filaments.

This control and operating circuit for a multifilament incandescent lamp is provided with two input terminals T1 and T2 for connection to the two-wire electrical power line LN, and three pairs of output terminals, for connection to the three filaments of the lamp respectively, in particular first filament F1 is connected to terminals I1 and O1, second filament F2 is connected to terminals I2 and O2, and third filament F3 is connected to terminals I3 and O3. Of course more filaments may be provided in the lamp and more pairs of terminals may be provided for circuitry C. In general, it is desirable that the circuit should be provided with at least N+1 output terminals, where N represents the number of filaments.

Circuit C includes:

a) extraction means EM, connected to input terminals T1 and T2;

b) decoding means DM, connected to the output from extraction means EM;

c) operating means AM, connected to the outputs from decoding means DM; and d) at least three controlled electronic switches SW1, SW2, SW3 (at least one for each filament) having control terminals C1, C2, C3, respectively, connected to the outputs from operating means AM, first main operating terminals connected to input terminal T1 and second main operating terminals connected respectively to first terminals I1, I2, I3 of the pairs of output terminals.

In addition, second terminals O1, O2, O3 of the pairs of output terminals are connected together to input terminal T2. It will be noted that the route extending from the first main operating terminal to the second terminal includes a so-called "main conduction path" for the switch.

Means EM are capable of extracting the selection signal from the feed. Means DM are capable of decoding the selection signal extracted in order to generate a plurality of substantially digital signals which indicate which of the filaments of the lamp should be kept lit. Means AM, which are equal in number to the controlled electronic switches in the embodiment in FIG. 2, are used to generate electrical signals designed to operate the switches from the digital signals provided by means DM. The extraction circuit EM, decoding circuit DM, and operating circuit AM are individually well known and are described, for example, in the two previously referenced European Patent Applications Nos. EP 247 382 and EP 244 777.

If the signal is not sent via the two-wire electrical power line, means EM are capable of extracting the selection signal from a different transmission means.

If the switches are of a type that can be controlled directly by means of a digital signal, means AM corresponds to the output stage from the logic gates generating the digital signals.

In one embodiment, means DM may be reduced to a series-to-parallel conversion circuit.

A typical embodiment of switches SW1, SW2, SW3 includes devices of the TRIAC type or power MOS type.

Means EM, DM and AM are incorporated into a block IC. This block can be incorporated quite easily into a single chip, which is of course advantageous if circuitry C is to be inserted into attachment A. It is even more advantageous to incorporate switches SW1, SW2, SW3 into the same chip as well. However, on the one hand, the size of the chip increases considerably, given that these are power devices and therefore occupy an appreciable area of silicon. On the other hand, the risk of interference between the various parts of the circuit is made worse by the high voltages and/or power involved. Technology is, however, available on the market which permits both forms of integration.

Means EM, DM and AM require a supply. If this supply cannot be obtained directly from terminals T1 and T2 (as in most cases), it will be necessary to provide supply means.

If the voltage between terminals T1 and T2 is a low frequency sinusoidal voltage, for example between 40 and 70 Hz, and has a large amplitude, for example between 70 and 100 volts, the electrical diagram of a circuit corresponding to a possible embodiment of such supply means will substantially include the connection of a resistor, a condenser and a diode in series. The time constant determined by the resistor and the condenser must be very small with respect to the period of the sinusoidal voltage, and will determine the steady output voltage. Preferably the output voltage is relatively steady and typically the output voltage varies by no more than plus or minus 10% from the nominal supply voltage. If the output voltage is not sufficiently steady for the requirements of means EM, DM, and AM, conventional stabilizing systems may be used such as a monolithic linear voltage regulator from the Motorola MC7800 series or SGS-Thomson L7800 series. This circuit can quite easily be incorporated into one chip.

If the filaments are of different power ratings it is desirable that the switches be dimensioned in such a way that they are capable of switching only electrical power of the corresponding rating, in such a way that integration is also eased, given that the switches will occupy the minimum area necessary. In particular, since it is advantageous, as already illustrated, to select filaments of a power rating in which one power rating is substantially twice the other, it will be advantageous if such switches are dimensioned in such a way that they are capable of switching electrical power where one level is substantially twice another.

The word connected, which has been frequently used above, means a direct or intermediate connection to other electrical devices.

This invention is suitable for use in circumstances where the supply is either a steady voltage or an alternating voltage. It will of course be necessary to use different circuitry.

In the above description reference was made to the situation in which the selection signal is sent to the circuitry via the two-wire electrical line. As stated, this is not necessary. In circumstances where the signal is provided by additional wires and/or means, the circuitry will be simplified and the expense of the complexity and cost of the circuitry will be reduced.

From the foregoing it will be appreciated that, although specific embodiments of the invention have been described herein for purposes of illustration, various modifications may be made without deviating from the spirit and scope of the invention. Accordingly, the invention is not limited except as by the appended claims.

I claim:

1. An incandescent lamp comprising:
   an attachment for connection to a two-wire electrical power line;
   a bulb;
   at least two filaments housed within said bulb; and
   circuitry housed within said attachment and connected to the electrical power line, said circuitry being structured to provide a selective feed from the electrical power line to a selected number of the filaments in response to a selection signal indicating a level of brightness, the selection signal being received from the electrical power line.

2. A lamp according to claim 1, in which the filaments are capable of radiating light in which brightness from one filament is substantially twice that from another filament.

3. A lamp according to claim 1 wherein said bulb includes three filaments.

4. A lamp according to claim 1 wherein said circuitry is capable of providing power from the electrical power line to a predetermined number of the filaments in the absence of the selection signal.

5. A lamp according to claim 1 wherein said circuitry is capable of providing a feed selectively in relation to the operating condition of the filaments.

6. A control and operating circuit for a multifilament incandescent lamp, the circuit comprising:
   two input terminals for connection to a two-wire electrical power line;
   at least two outputs for connection to at least two filaments of the lamp;
   an extraction circuit, the extraction circuit having an input connected to the two input terminals and an output;
   a decoding circuit connected to the output from said extraction circuit, the decoding circuit having a plurality of outputs;
   an operating circuit connected to the outputs from said decoding circuit, the operating circuit having a plurality of outputs; and
   at least two controlled electronic switches having control terminals which are connected to the outputs from said operating circuit and which have corresponding principal conduction paths, in which said at least two outputs are connected to said two input terminals respectively through at least the principal conduction paths for said at least two controlled electronic switches.

7. A circuit according to claim 6 wherein said at least two controlled electronic switches are dimensioned in such a way so as to be able to switch levels of electrical power in which one level of electrical power is substantially twice another level of electrical power.

8. A circuit according to claim 6 wherein one or more of said extraction, decoding and operating circuits are integrated in one chip.

9. A method for varying a brightness of a light having a color obtained from an incandescent lamp without varying the characteristics of the color of the light, the lamp being provided with an attachment for connection to a two-wire electrical power line and a bulb, the method comprising the steps of:
   providing the lamp with at least two filaments and housing them in the bulb;
   providing circuitry in said attachment having an input connected to the electrical power line and having an output connected to the filaments;
   sending a selection signal indicating a level of brightness to the circuitry along the electrical power line; and
   selectively supplying a feed from the electrical power line to a selected number of the filaments through the circuitry on the basis of the selection signal.

10. A method according to claim 9 wherein said step of providing the lamp with at least two filaments comprises the step of selecting the filaments such that the brightness level of one filament is substantially twice the brightness level of another filament.

11. A method according to claim 9 wherein said step of selectively supplying a feed from the electrical power line comprises the step of supplying power to a predetermined number of the filaments when the selection signal is absent.

12. A method according to claim 9 wherein said step of selectively supplying a feed from the electrical power line comprises the step of selectively providing a supply in relation to the operating state of the filaments.

13. A method for providing light from an incandescent lamp comprising the steps of:

provinding the lamp with at least three filaments; each filament being structured to provide a light having a brightness which is different from the brightness provided by each of the other filaments;

housing the lamp in a bulb;

providing the lamp with an attachment for connection to an electrical power line;

providing the lamp with a control circuit in the attachment having an input and an output;

connecting the input of the control circuit to the electrical power line;

connecting the output of the control circuit to the filaments;

supplying a selection signal to the control circuit from the electrical power line; and selectively supplying power from the electrical power line through the control circuit to each of the filaments by disconnecting one or more of the filaments from the electrical power line and connecting the remaining filaments to the electrical power line according to the selection signal.

14. The lamp of claim 1, wherein the circuitry comprises:

an extraction circuit, the extraction circuit having an input connected to the attachment and an output;

a decoding circuit having an input coupled to the output from the extraction circuit, the decoding circuit having a plurality of outputs;

an operating circuit connected to the outputs from the decoding circuit, the operating circuit having a plurality of outputs; and at least two controlled electronic switches having control terminals which are connected to the outputs from the operating circuit and which have corresponding principal conduction paths, in which at least two outputs are connected to the at least two filaments respectively through at least the principal conduction paths for the switches.

15. The lamp of claim 1, wherein one or more of said extraction, decoding and operating circuits are integrated in one chip.

16. The method of claim 9, wherein providing circuitry in said attachment comprises:

providing an extraction circuit, the extraction circuit having an input connected to the attachment and an output;

providing a decoding circuit having an input coupled to the output from the extraction circuit, the decoding circuit having a plurality of outputs;

providing an operating circuit connected to the outputs from the decoding circuit, the operating circuit having a plurality of outputs; and providing at least two controlled electronic switches having control terminals which are connected to the outputs from the operating circuit and which have corresponding principal conduction paths, in which the principal conduction paths are connected to the at least two filaments respectively.

17. The method of claim 16, wherein providing an extraction circuit, providing a decoding circuit and providing an operating circuit comprises providing one or more of said extraction, decoding and operating circuits integrated in one chip.

18. The method of claim 13, wherein providing the lamp with a control circuit comprises:

providing an extraction circuit, the extraction circuit having an input connected to the attachment and an output;

providing a decoding circuit having an input coupled to the output from the extraction circuit, the decoding circuit having a plurality of outputs;

providing an operating circuit connected to the outputs from the decoding circuit, the operating circuit having a plurality of outputs; and providing at least three controlled electronic switches having control terminals which are connected to the outputs from the operating circuit and which have corresponding principal conduction paths, in which the principal conduction paths are connected to the at least three filaments respectively.

* * * * *